United States Patent [19]

Suzuki

[11] Patent Number: 5,428,715
[45] Date of Patent: Jun. 27, 1995

[54] THREE-DIMENSIONAL FIGURE DATA GENERATOR DEVICE

[75] Inventor: Junko Suzuki, Nagoya, Japan

[73] Assignee: Mitsubishi Denki Kabushiki Kaisha, Tokyo, Japan

[21] Appl. No.: 850,584

[22] Filed: Mar. 13, 1992

[30] Foreign Application Priority Data

Mar. 14, 1991 [JP] Japan .................. 3-049563

[51] Int. Cl.⁶ .................. G06T 15/20; G06T 17/40
[52] U.S. Cl. ...................... 395/119; 395/120
[58] Field of Search ............... 395/119, 120, 161, 127; 364/512

[56] References Cited

U.S. PATENT DOCUMENTS

| 4,855,939 | 8/1989 | Fitzgerald et al. | 364/512 X |
| 4,868,766 | 9/1989 | Oosterholt | 364/512 X |
| 5,010,502 | 4/1991 | Diebel et al. | 395/119 |
| 5,138,697 | 8/1992 | Yamamoto et al. | 395/120 |
| 5,177,474 | 1/1993 | Kadota | 395/119 X |
| 5,303,337 | 4/1994 | Ishida | 395/119 |

FOREIGN PATENT DOCUMENTS

| 0248919 | 12/1987 | European Pat. Off. |
| 2598000 | 4/1987 | France . |
| 62-133647 | 8/1987 | Japan . |
| 214373 | 7/1988 | Japan . |
| 281271 | 3/1990 | Japan . |
| 2127786 | 5/1990 | Japan . |

OTHER PUBLICATIONS

H. H. Raab, "Software-Ergonomie Optimiert Rechnerdialog", *Wekstatt Und Betrieb,* vol. 123, No. 12, 1990 pp. 272–274.

J. Hagen, "Experience with Three-Dimensional CAD/CAM in Mould and Tool Making", *Industrial & Production Engineering,* vol. 14, No. 2, 1990 pp. 43–47.

*Primary Examiner*—Mark K. Zimmerman
*Assistant Examiner*—Cliff N. Vo
*Attorney, Agent, or Firm*—Rothwell, Figg, Ernst & Kurz

[57] ABSTRACT

A three-dimensional figure data generator device for a numerically controlled machine tool, etc., includes a two-dimensional figure definer/editor unit and a two-dimensional view data setter unit. The two-dimensional figure data and the two-dimensional view data are stored in a two-dimensional figure data memory and a two-dimensional view data memory, respectively, with identifying data numbers. When a two-dimensional figure element is specified on the screen, the data number thereof is determined from the display region of the figure element, and the corresponding projection direction and two-dimensional figure data are retrieved from the two-dimensional view data memory and the two-dimensional figure data memory, respectively, such that the three-dimensional figure data for the figure element can be generated.

3 Claims, 14 Drawing Sheets

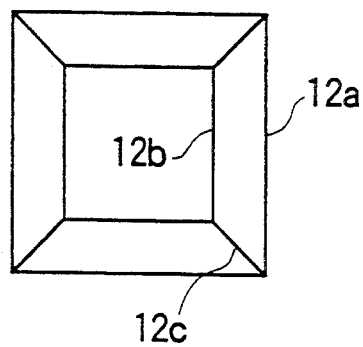
FIG. 12(A)
FIG. 12(B)
FIG. 13
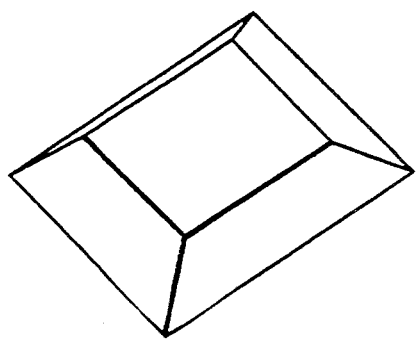

FIG. 18
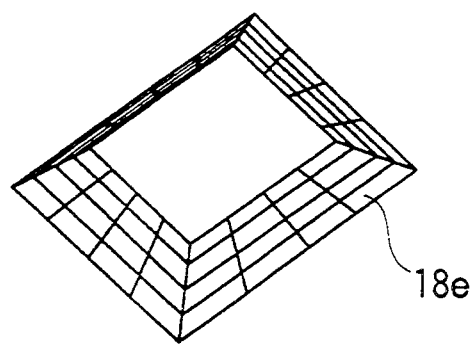
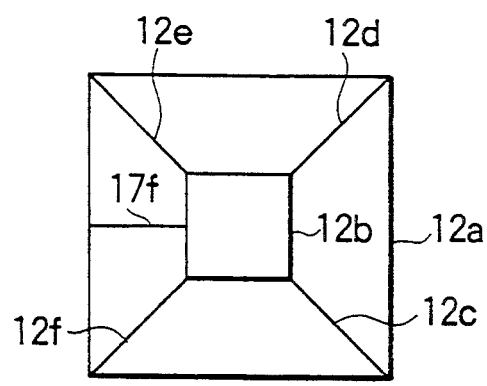
FIG. 19(A)
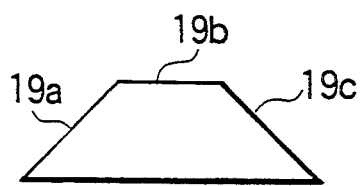
FIG. 19(B)

THREE-DIMENSIONAL FIGURE DATA GENERATOR DEVICE

BACKGROUND OF THE INVENTION

This invention relates to three-dimensional figure data generator devices for generating three-dimensional figure data representing three-dimensional figures.

FIG. 10 is a block diagram showing a conventional CAD/CAM device including a three-dimensional figure data generator device. The forms of figures or the coordinate values for specifying the work paths of a numerically controlled machine tool (not shown), etc., are input via a keyboard 1, a mouse 2, or a tablet 3. An input processing unit 4 converts the data input via the keyboard 1, the mouse 2, or the tablet 3 into internal data. A three-dimensional view data setter unit 5 sets and edits three-dimensional view data including: projection data representing the directions along which the three-dimensional figures are projected; and display data representing display reference data concerning the display positions and domains of two-dimensional figures on the display screen obtained view the projections along the projection directions as indicated by the projection data. A three-dimensional view data memory 6 stores three-dimensional view data. A three-dimensional figure definer/editor unit 7 defines and edits the three-dimensional figure data of the three-dimensional figures. Three-dimensional figure data as used in this specification refers to figure data including three-dimensional coordinate information. A three-dimensional figure data memory 8 stores the three-dimensional figure data of the three-dimensional figures defined and edited by the three-dimensional figure definer/editor unit 7.

In response to the work instructions received from an external source, a work processing unit 9 generates the work information for working three-dimensional figure articles. A display processing unit 10 processes the display data (i.e., the data on the projected figures and the work paths of the numerically controlled machine tool (not shown)) displaced on the CRT display device 12. In response to the work information output from the work processing unit 9, a numerical control data generator unit 11 generates numerical control data for the numerically controlled machine tool, and a numerical control data file device 13 stores the numerical control data generated by the numerical control data generator unit 11.

Next, the operation of the conventional device is described. FIG. 11 is a flowchart showing the three-dimensional figure data generation procedure of the device of FIG. 10. The figure data of the pyramidal frustum as shown in FIG. 13 are given as the orthographic views of FIG. 12, to define the pyramidal frustum as the three-dimensional figure data.

At step S1101 in FIG. 11, three-dimensional view data are set. The three-dimensional view data represents: the projection directions for the three-dimensional figure, and the display positions and domains within the screen where the two-dimensional figures as obtained by the projections are shown. FIG. 14 shows the display domains and coordinate axes in accordance with the three-dimensional view data for projecting the figure along three distinct directions. The three projection directions are; Z-axis, Y-axis, and direction of the vector (1, 1, 1), The three views obtained by the projections are thus a top and side view, and a view as projected on the plane perpendicular to the vector (1, 1, 1).

Next the execution proceeds to step S1102, where it is determined whether or not the elements of the projected figure can be defined by coordinate plane data. Let us first take the example of the contour figure element 12a of the top view of the figure shown at (A) in FIG. 12. Then, at step S1102 it is determined whether or not the contour figure element 12a is definable by means of two-dimensional figure data on a plane defined by one of the equations: X=constant, Y=constant, or Z=constant. The contour figure element 12a lies on the plane: Z=0. The judgment at step S1102 is thus affirmative in this case, and the execution proceeds to step S1103. If the judgment at step S1102 is negative, the execution proceeds to step S1105 as described below.

At step S1103, the character information: Z=0 for specifying the coordinate plane on which the contour figure element 12a lies is input, and the execution proceeds to step S1104.

At step S1104, the values of X and Y coordinates of the four vertices of the contour figure element 12a are input. The mouse 2, etc., may be used for inputting the coordinate values together with the keyboard 1.

At the next step S1106, the three-dimensional figure data representing the contour figure element 12a input at step S1103 and step S1104 are stored in the three-dimensional figure data memory 8. Further, the two-dimensional figure elements obtained by projecting the contour figure element 12a on the three planes as shown in FIG. 14 are displayed on the screen as shown in FIG. 15.

At the next step S1107, it is determined whether or not all the figure elements of the three-dimensional figure are input. If the judgment is negative, the execution returns to step S1102 such that remaining data are input. If the judgment is affirmative, the execution is terminated.

Thus, after the figure data on the contour figure element 12a are input, the execution returns to step S1102 to input data on the contour figure element 12b and the ridge figure element 12c of FIG. 12. The data on the contour figure element 12b are input via the steps S1103 through S1106 in a manner similar to the above.

On the other hand, the ridge figure element 12c does not lie on a plane defined by one of the equations: X=constant, Y=constant, or Z=constant. Thus, the ridge figure element 12c cannot be defined by a coordinate plane data and two-dimensional figure data as described above, hence, the judgment at step S1102 is negative. Thus, the execution proceeds to step S1105, where the X, Y, and Z coordinate values of the two end points 16d and 16e (as shown in FIG. 16) are input. The data on the other ridges a shown in FIG. 17 are input in a similar manner.

FIG. 18 is a perspective view of a pyramidal frustum having curved side surfaces. In order to define the latticed curved surface 18e, the contour curves 17g and 17h and the section curve 17i shown in FIG. 17 are drawn on the display screen by the mouse 2, etc. by the way, the curve 17f is an auxiliary for defining the section of the curved surface 18e.

By repeatedly inputting the figure data representing each element of the three-dimensional figure as shown in the flowchart of FIG. 11, all the three-dimensional figure data are input. The data on the three-dimensional figure may further be edited. For example, the height of the pyramidal frustum may be modified from that shown in FIG. 19 to that shown in FIG. 20.

The modification is done as follows.

First, the contour figure element 12*b* of the top surface is designated, and the Z coordinate value for the coordinate plane carrying the contour figure element 12*b* is modified. Next, the ridge figure elements 12*c*, 12*d*, 12*e*, and 12*f* and the auxiliary curve 17*f* for the section of the curved surface 18*e* are designated and removed. The contour figure element 12*b* is thus modified into a contour figure element 20*b* (see FIG. 20). The ridge figure elements and the auxiliary curves are redefined to connect the contour figure element 12*a* and the newly obtained element 20*b*.

The above three-dimensional figure data generator device, however, has the following disadvantage. Since the operator must input, as part of the input data, the three-dimensional figure data such as the coordinate values within the three-dimensional space, he or she must first reconstruct the form of three-dimensional figure in his or her mind from the three orthographic views. Thus, the data input operation is prone to errors and is inefficient.

Thus, Japanese Laid-Open Patent (Kokai) No. 2-81271 teaches a device in which from two-dimensional figure data corresponding to the three orthographic views three dimensional figures are generated resulting from projections in predetermined perspective directions. This device, however, also suffers from the disadvantage that the operation is complicated since the end points of respective two-dimensional figures must be divided into groups and the correspondences between the respective end points must be established by the operator. Further, the shapes of the three-dimensional figure that can be processed are limited and three-dimensional objects having free curved surfaces can hardly be treated. Furthermore, the restrictions on the screen display are great. Namely, the screen display does not allow the selective display of the orthogonal two-dimensional figures or two-dimensional figure along the perspective projection, or the display region and position of the selected two-dimensional figures cannot be set freely by the operator.

SUMMARY OF THE INVENTION

It is therefore an object of this invention to provide a three-dimensional figure data generator device by which two-dimensional projection figures of a three-dimensional figure can easily be set and displayed, and data on the three-dimensional figures having free curved surfaces, etc., can be input efficiently and easily and accurate three-dimensional figure data are generated.

The above object is accomplished in accordance with the principle of this invention by a three-dimensional figure data generator device which comprises two-dimensional view data setter unit means for setting two-dimensional view data including: projection data representing a first and a second projection direction of a three-dimensional figure; and display data specifying a first and a second display region of a first and a second two-dimensional projection view, respectively, of the three-dimensional figure along the first and second projection directions; two-dimensional view data memory means for storing the two-dimensional view data; two-dimensional figure data setter means for setting two-dimensional figure data defining two-dimensional forms of two-dimensional figures of the first and second two-dimensional projection views; two-dimensional figure data memory means for storing the two-dimensional figure data; three-dimensional figure data generator means for generating three-dimensional figure data of the three-dimensional figure representing a three-dimensional form of the three-dimensional figure in accordance with the two-dimensional figure data stored in the two-dimensional figure data memory means and the projection data stored in the two-dimensional view data memory means; and display means for displaying the two-dimensional figures of the first and second two-dimensional projection views in accordance with the two-dimensional figure data stored in the two-dimensional figure data memory means and the display data stored in the two-dimensional view data memory means.

Preferably, a first set of two-dimensional view data representing the first projection direction and the first display region and a second set of two-dimensional view data representing the second projection direction and the second display region are stored in the two-dimensional view data memory means with respective distinct two-dimensional view data numbers; a first set of two-dimensional figure data defining the two-dimensional figure of the first projection view and a second set of two-dimensional figure data defining the two-dimensional figure of the second projection view stored in the two-dimensional figure data memory means with respective distinct two-dimensional figure data numbers corresponding to the respective two-dimensional view data numbers of the first and second sets of two-dimensional view data; and the three-dimensional figure data generator means establishes correspondence between the first and second sets of two-dimensional figure data and the first and second sets of two-dimensional view data on the basis of the two-dimensional view data numbers and the two-dimensional figure data numbers.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 12 shows orthographic views of the pyramidal frustum of FIG. 13 given as three-dimensional figure data;

FIG. 13 is a perspective view of a pyramidal frustum;

FIG. 18 is a perspective view of a pyramidal frustum having curved side surfaces;

FIG. 19 is a view of a pyramidal frustum before an editing process; and

In the drawings, like reference numerals represent like or corresponding parts or portions.

DETAILED DESCRIPTION OF THE PREFERRED EMBODIMENTS

Figure 1:
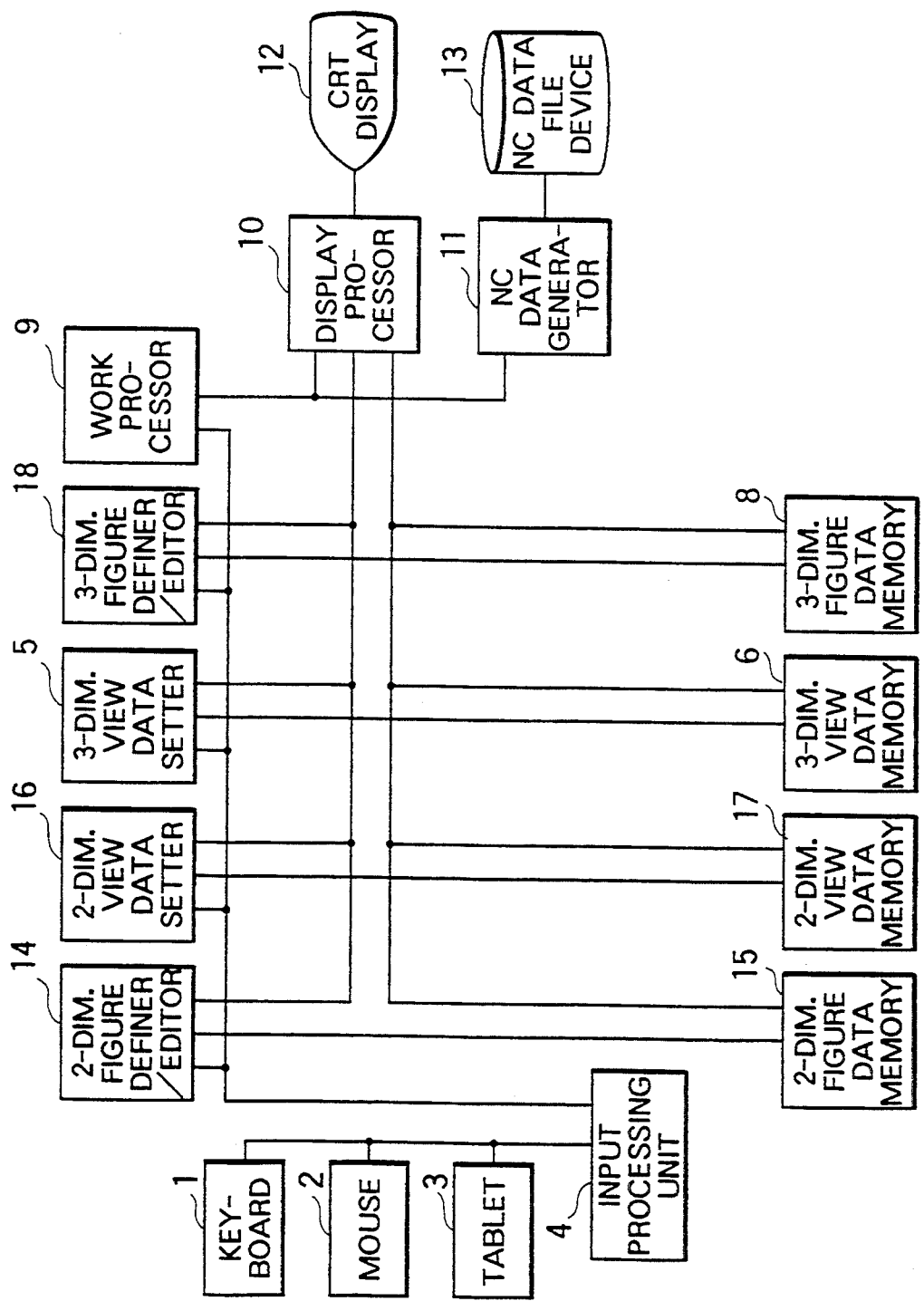
FIG. 1 is a block diagram showing a CAD/CAM device including a three-dimensional figure data generator device according to this invention.

Referring now to the accompanying drawings, the preferred embodiments of this invention are described. FIG. 1 is a block diagram showing a CAD/CAN device including a three-dimensional figure data generator device according to this invention. In FIG. 1, the parts 1 through 6 and the parts 8 through 13 are similar to those described above by reference to FIG. 10.

Further, a two-dimensional figure definer/editor unit 14 sets and defines the two-dimensional figures which are projection figures of a three-dimensional figure along predetermined projection directions. Further, and two-dimensional figure definer/editor unit 14 edits and modifies the two-dimensional figures.

A two-dimensional figure data memory 15 stores the two-dimensional figure data of the two-dimensional figures defined and edited by the two-dimensional figure definer/editor unit 14. The two-dimensional figure data as used herein refer to the figure data consisting of two-dimensional coordinate information.

A two-dimensional view data setter unit 16 sets two-dimensional view data consisting of: the projection data specifying the directions along which the three-dimensional figure is projected to obtain the two-dimensional figures; and the display data representing the display positions and regions of the two-dimensional figures within the screen. A two-dimensional view data memory 17 stores the two-dimensional view data set by the two-dimensional view data setter unit 16.

Figure 10:
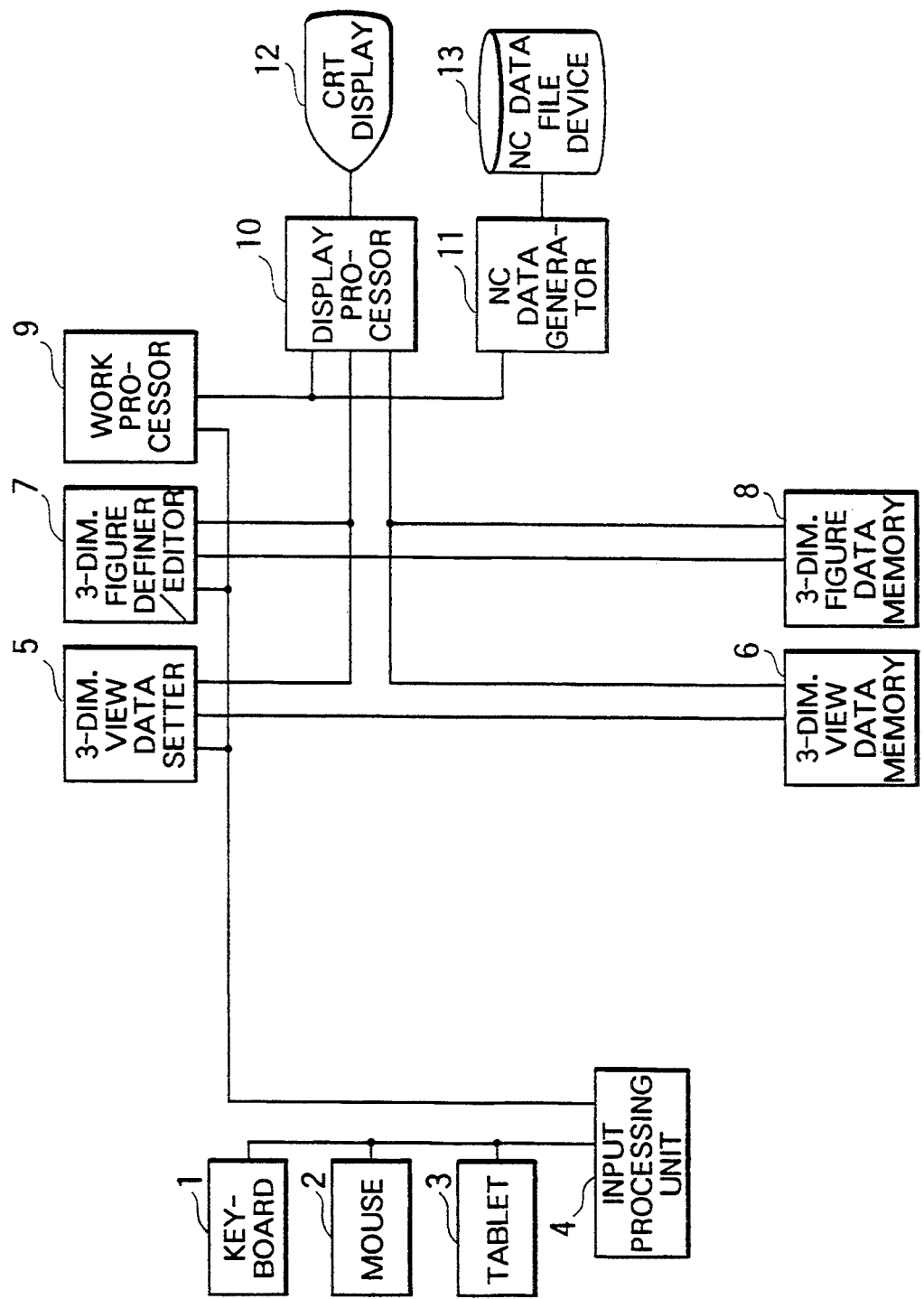
FIG. 10 is a block diagram showing a conventional CAD/CAM device including a three-dimensional figure data generator device.
Figure 11:
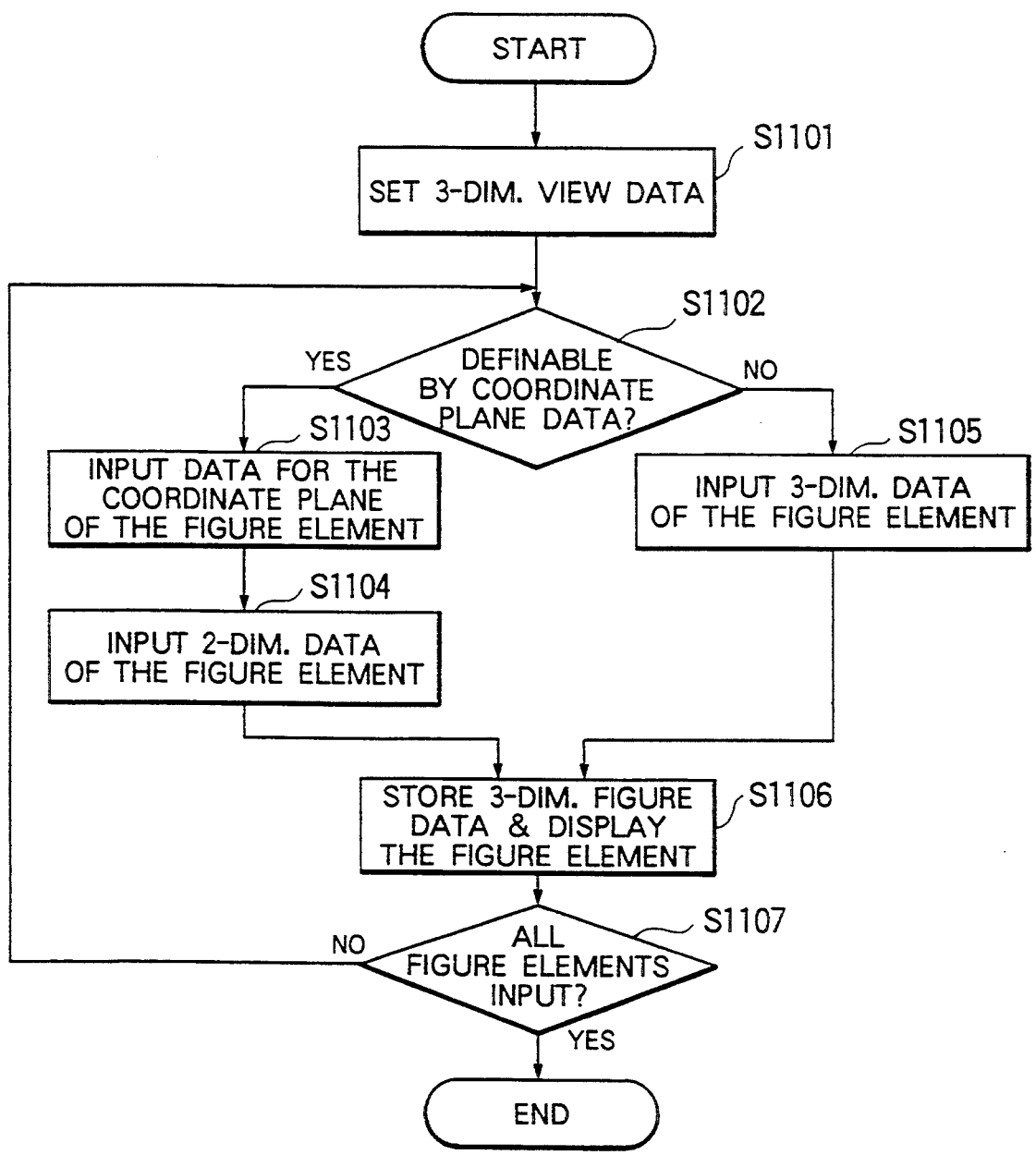
FIG. 11 is a flowchart showing the three-dimensional figure data generation procedure of the device of FIG. 10.
Figure 14:
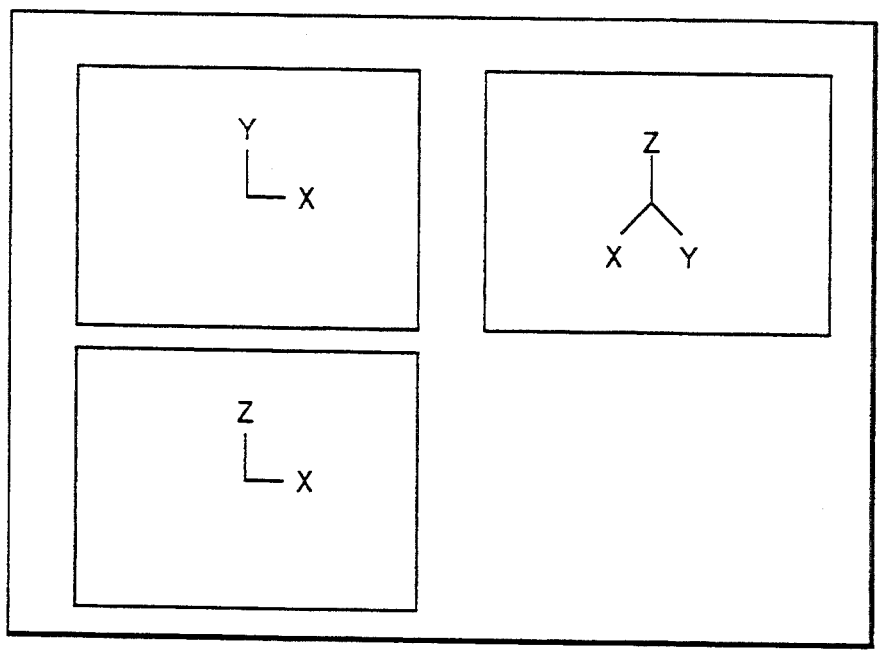
FIG. 14 shows the display domains and coordinate axes in accordance with the three-dimensional view data for projecting the figure along three distinct directions.
Figure 15:
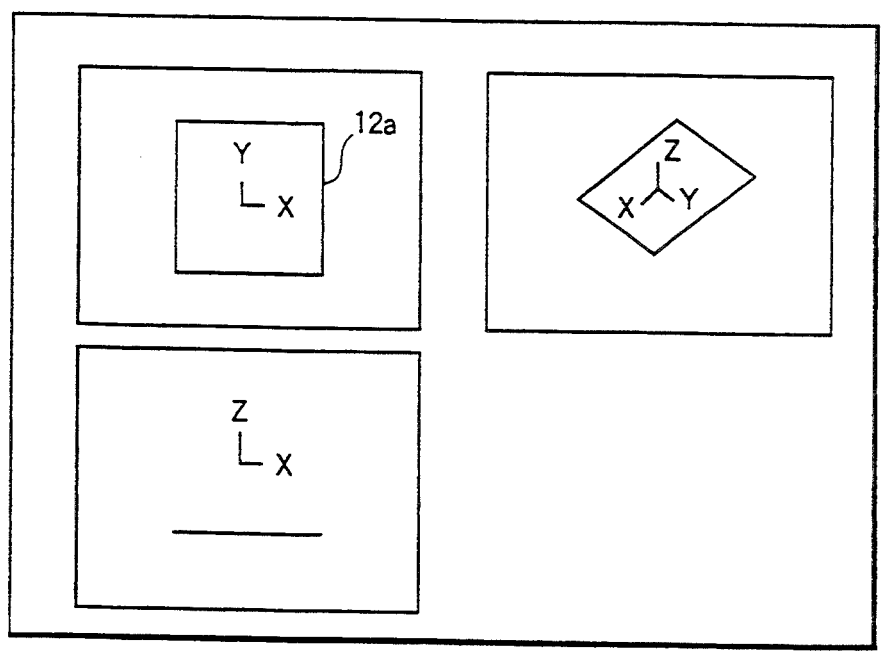
FIG. 15 shows a two-dimensional figure element obtained by the projections and displayed on the screen.
Figure 16:
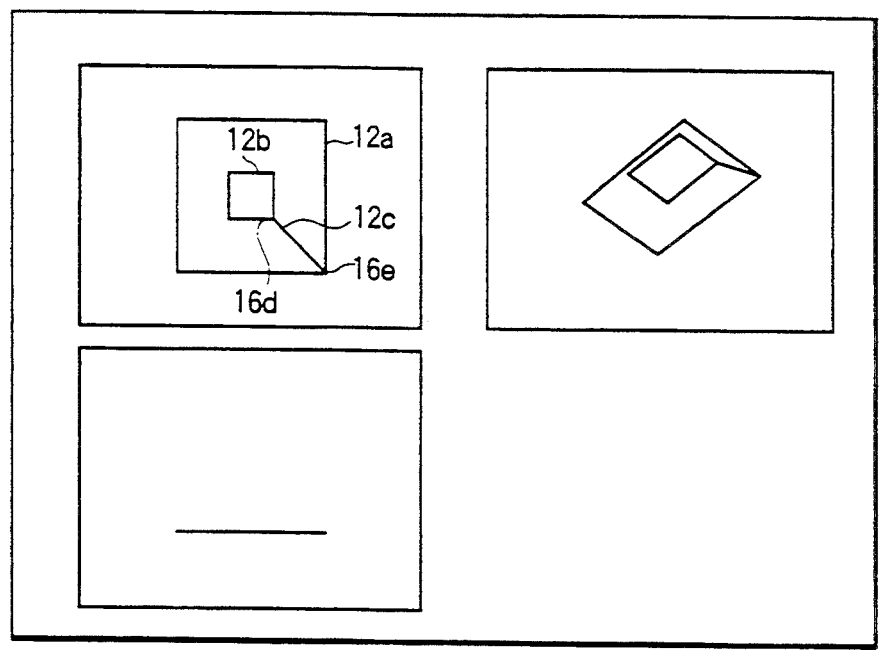
FIG. 16 shows several two-dimensional figure elements displayed on the screen.
Figure 17:
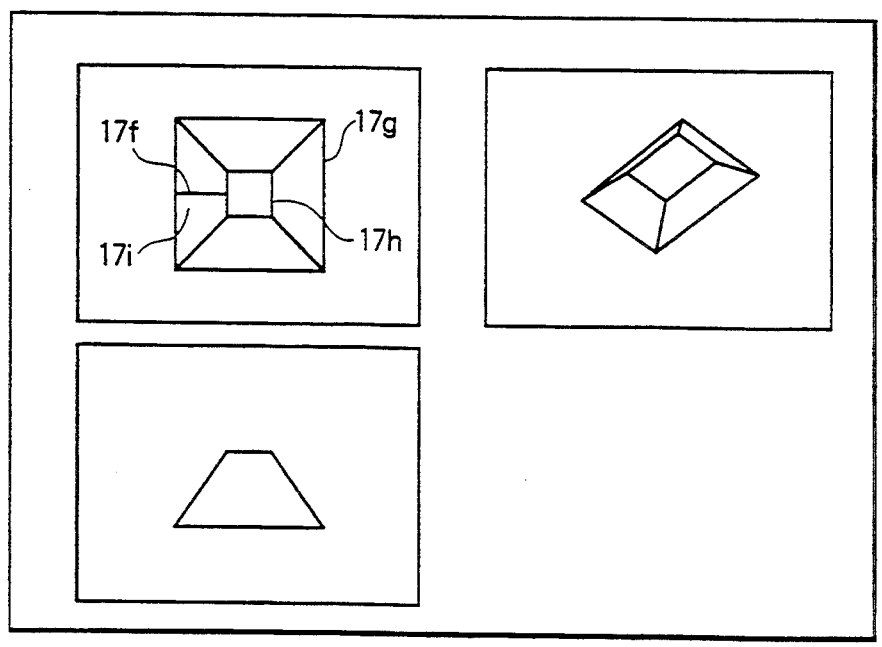
FIG. 17 shows the three orthographic views of a pyramidal frustum displayed on the screen.

A three-dimensional figure definer editor unit 18 defines and edits the three-dimensional figures not only by means of the three-dimensional figure data as in the case of the three-dimensional figure definer/editor unit 7 of FIG. 10. The three-dimensional figure definer/editor unit 18 also defines and edits the three-dimensional figures on the basis of the information stored in the two-dimensional figure data memory 15 and the two-dimensional view data memory 17. The three-dimensional figure definer/editor unit 18 thus generates three-dimensional figure data.

In FIG. 1, the three-dimensional figure data generator device according to this invention consists of: the input devices such as the keyboard 1, the mouse 2, and the tablet 3; the input processing unit 4; the three-dimensional view data setter unit 5; the three-dimensional view data memory 6; the three-dimensional figure data memory 8; the display processing unit 10; the CRT display device 12; the two-dimensional figure definer-/editor unit 14; the two-dimensional figure data memory 15; the two-dimensional view data memory 17; and the three-dimensional figure definer/editor unit 18.

Next, the operation of the three-dimensional figure data generator device of FIG. 1 is described. As a specific example of three-dimensional figure, the pyramidal frustum shown in FIG. 13 is assumed. The pyramidal frustum is specified by means of the orthographic views shown in FIG. 12, and three-dimensional figure data of the pyramidal frustum is generated and displayed.

Figure 2:
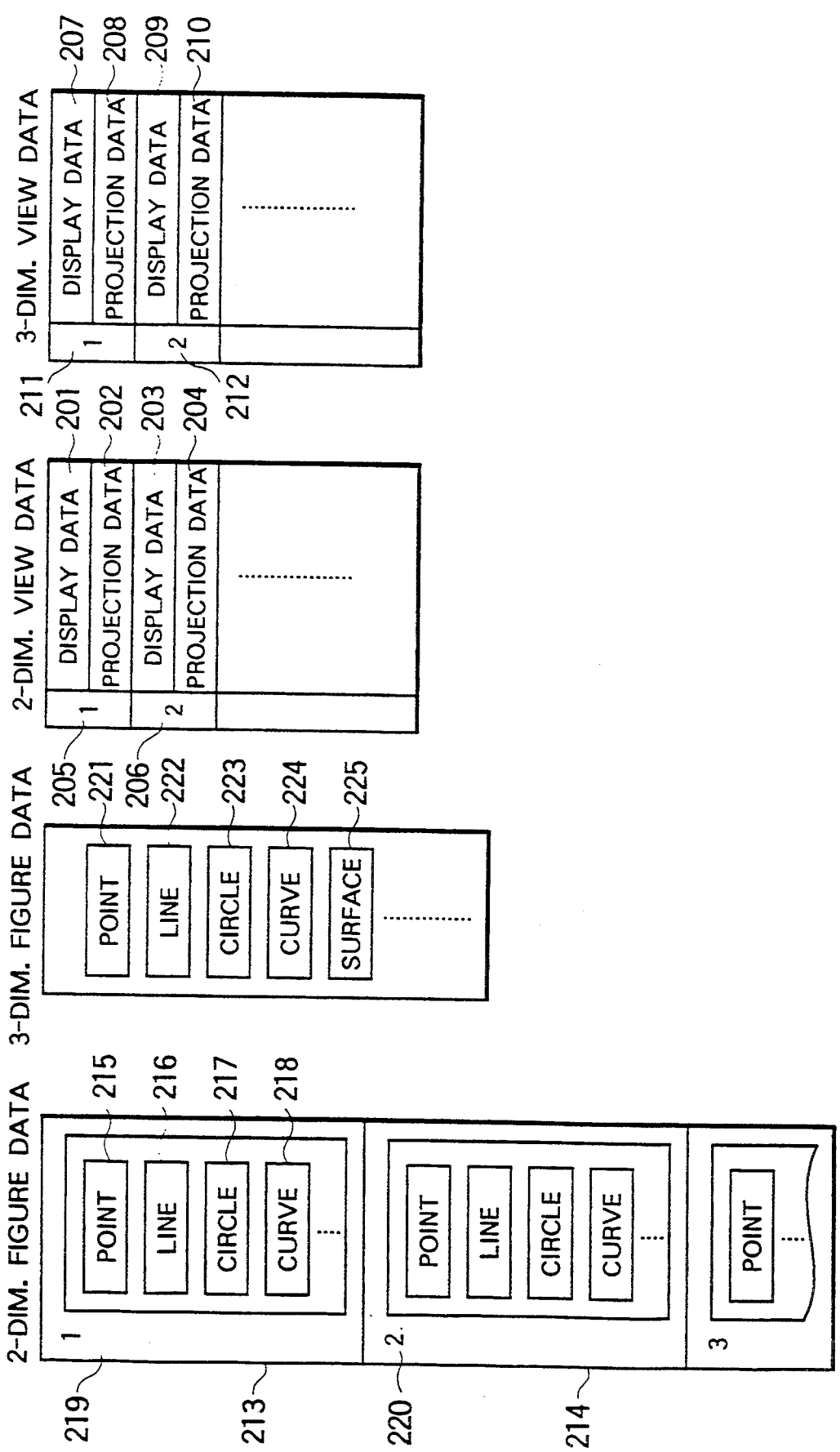
FIG. 2 is a diagram showing the items of two-dimensional and three-dimensional figure and view data stored in respective memories.
Figure 3:
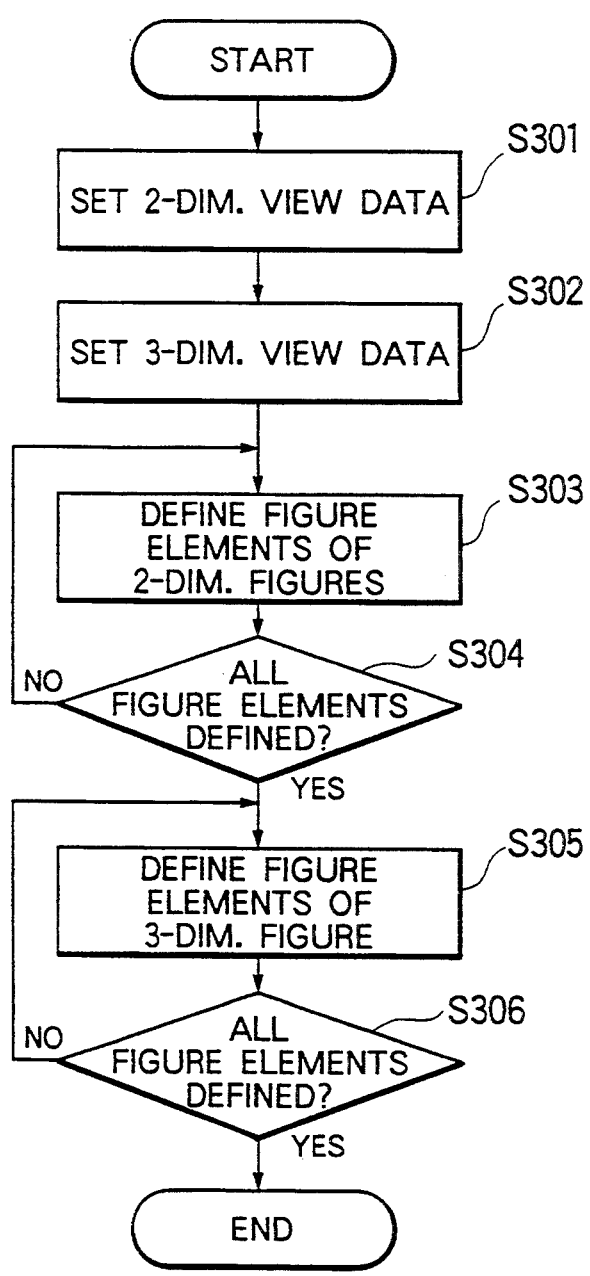
FIG. 3 is a flowchart showing the three-dimensional figure definition three-dimensional figure data generation procedure according to this invention.

FIG. 2 is a diagram showing the items of two-dimensional and three-dimensional figure and view data stored in respective memories. FIG. 3 is a flowchart showing the three-dimensional figure defined and three-dimensional figure data generation procedure according to this invention.

At step S301, a predetermined number of sets of the two-dimensional view data are set via the two-dimensional view data setter unit 16. Thus, as shown at FIG. 2 (c), a first set 205 of the two-dimensional display data, the view data 201 and the projection data 202, for the two view, for example, are set and stored in the two-dimensional view data memory 17. Similarly, a second set 206 of the two-dimensional display data, the view data 203 and the projection data 204, for the front view, for example, are set and stored in the two-dimensional view data memory 17. The sets of two-dimensional view data are numbered in order as shown at the left column in box (c). These numbers, the two-dimensional view data numbers, are also stored in the two-dimensional view data memory 17 together with the corresponding sets of the two-dimensional view data.

Figure 4:
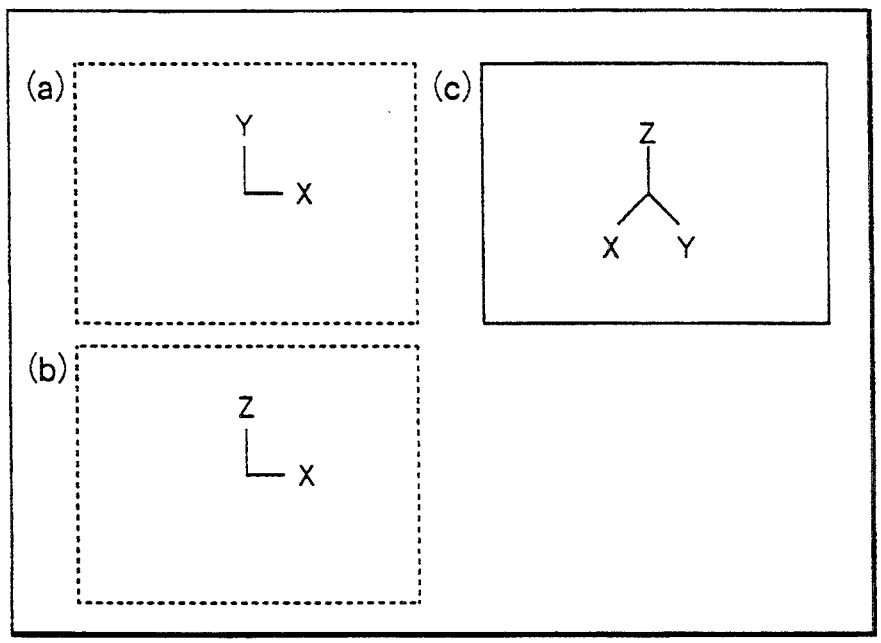
FIG. 4 shows display regions and coordinate axes of the respective views within the screen.

FIG. 4 (a) shows the display region and the coordinate axes of the first set of two-dimensional view data within the screen, where the projection direction is along the Z axis. Thus, the projection data 202 specifies the Z axis. The display region is shown by a dotted rectangular at (a) in FIG. 4 and is specified by display data 201. This view corresponds to the top view. FIG. 4 (b) shows the display region and the coordinate axes of the second set of two-dimensional view data within the screen, where the projection direction is along the Y axis. Thus, the projection data 204 specifies the Y axis. The display region is shown by a dotted rectangle at (b) in FIG. 4 and is specified by display data 203. This view corresponds to the front view.

When a predetermined number of sets 205 and 206 of two-dimensional view data are set at step S301, the execution proceeds to the next step S302.

At step S302, a predetermined number of sets of three-dimensional view data are set via the three-dimensional view data setter unit 5. As shown by the box (d)

in FIG. 2, a first set of three-dimensional view data 211, the display data 207 and the projection data 208, is stored in the three-dimensional view data memory 6. Further, where appropriate, a second set of three-dimensional view data 212, the display data 209 and the projection data 210, maybe set and stored in the three-dimensional view data memory 6. The sets of three-dimensional view data are numbered in order as shown at the left column in box (d). These numbers, the three-dimensional view data numbers, are stored in the three-dimensional view data memory 6 with the items of three-dimensional view data.

The solid-framed box (c) in FIG. 4 represents the display region and the coordinate axes in accordance with the first set of three-dimensional view data. The projection direction is a perspective direction along the vector (1, 1, 1). Thus, the three axes X, Y, and Z are shown in perspective within the two-dimensional display screen.

When the three-dimensional view data are set at step S302, the execution proceeds to the next step S303.

By the way, the order of the steps S301 and S302 is irrelevant. The step S302 may be executed first, followed by the step S301. Further, the numbers of the sets of the three-dimensional and the two-dimensional view data may be selected as desired. Where appropriate, the step S301 and the step S302 may thus be repeated several times. Furthermore, the two-dimensional and the three-dimensional view data may be edited and modified after input.

At step S303, the two-dimensional figure data specifying the forms of the figure elements of the two-dimensional figures (the top and the front views of the pyramidal frustum in this case) are input.

Thus, the two-dimensional figure data specifying the figure elements of the top view (the orthographic view via the projection along the Z axis as shown in FIG. 12(A) are input view the keyboard 1, the mouse 2, or the tablet 3, and displayed in the region (a) in FIG. 4. Similarly, the two-dimensional figure data specifying the figure elements of the front view (the orthographic view via the projection along the Y axis as shown in FIG. 12(B)) are input and displayed in the region (b) in FIG. 4.

Figure 5:
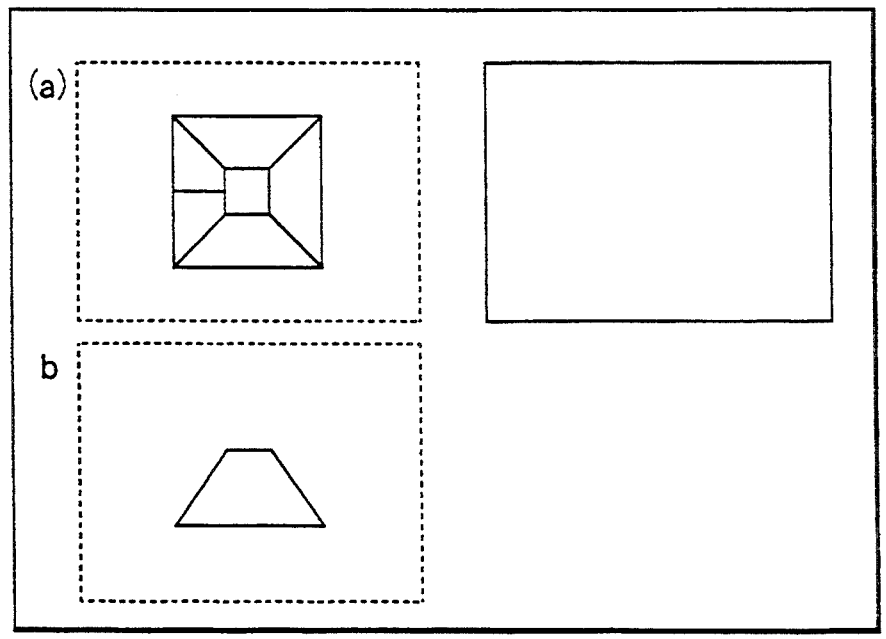
FIG. 5 shows the top and the front views displayed within respective regions in the screen after the completion of input of the two-dimensional figure data.

FIG. 5 shows the top and the front views displayed within respective regions in the screen after the completion of input of the two-dimensional figure data. Generally, the input two-dimensional figure data are stored in the two-dimensional figure data memory 15 as shown at the box (a) in FIG. 2. The first set of two-dimensional figure data 213 includes: point data 215 specifying points, line data 216 specifying lines, circle data 217 specifying circles, and curve data 218 specifying curves. The data are input where appropriate. The irrelevant data are left unfilled or deleted. Thus, for the top view of the pyramidal frustum shown in FIG. 12, the circle and the curve data are let unfilled or deleted. When there are a plurality of points the point data 215 include data (coordinate values) for the respective points. Similarly the line data 216 may include data for a plurality of lines.

Similarly, the second set of the two-dimensional figure data 214 includes: point data, line data, circle data, and curve data. The data are input where appropriate. Thus, for the front view as shown at (b) in FIG. 12, the circle and the curve data are left unfilled or deleted. On the other hand, the point and the line data include data for a plurality of points and lines, respectively.

The two-dimensional figure data numbers 219 and 220 stored in the two-dimensional figure data memory 15 with the corresponding items of two-dimensional figure data correspond to the two-dimensional view data numbers shown at the left column of the box (c). Thus, the first set of two-dimensional view data 205 corresponds to the first set of the two-dimensional figure data 213. Similarly, the second set of two-dimensional view data 206 corresponds to the second set of the two-dimensional figure data 214.

When the figure elements of a two-dimensional figure are input and defined at step S303, the execution proceeds to the next step S304. At step S304, it is determined whether or not all the figure elements of the two-dimensional figures are defined. If the judgment is negative, the control returns to step S303 to input the remaining elements; if the judgment is affirmative, the execution proceeds to the next step S305.

The input of the two-dimensional figure data at step S303 is simple and straightforward. It is not necessary for the operator to represent the three-dimensional form in his or her mind and to input the three-dimensional coordinate values. Thus, the input of the two-dimensional figure data is free of errors and efficient.

Figure 6:
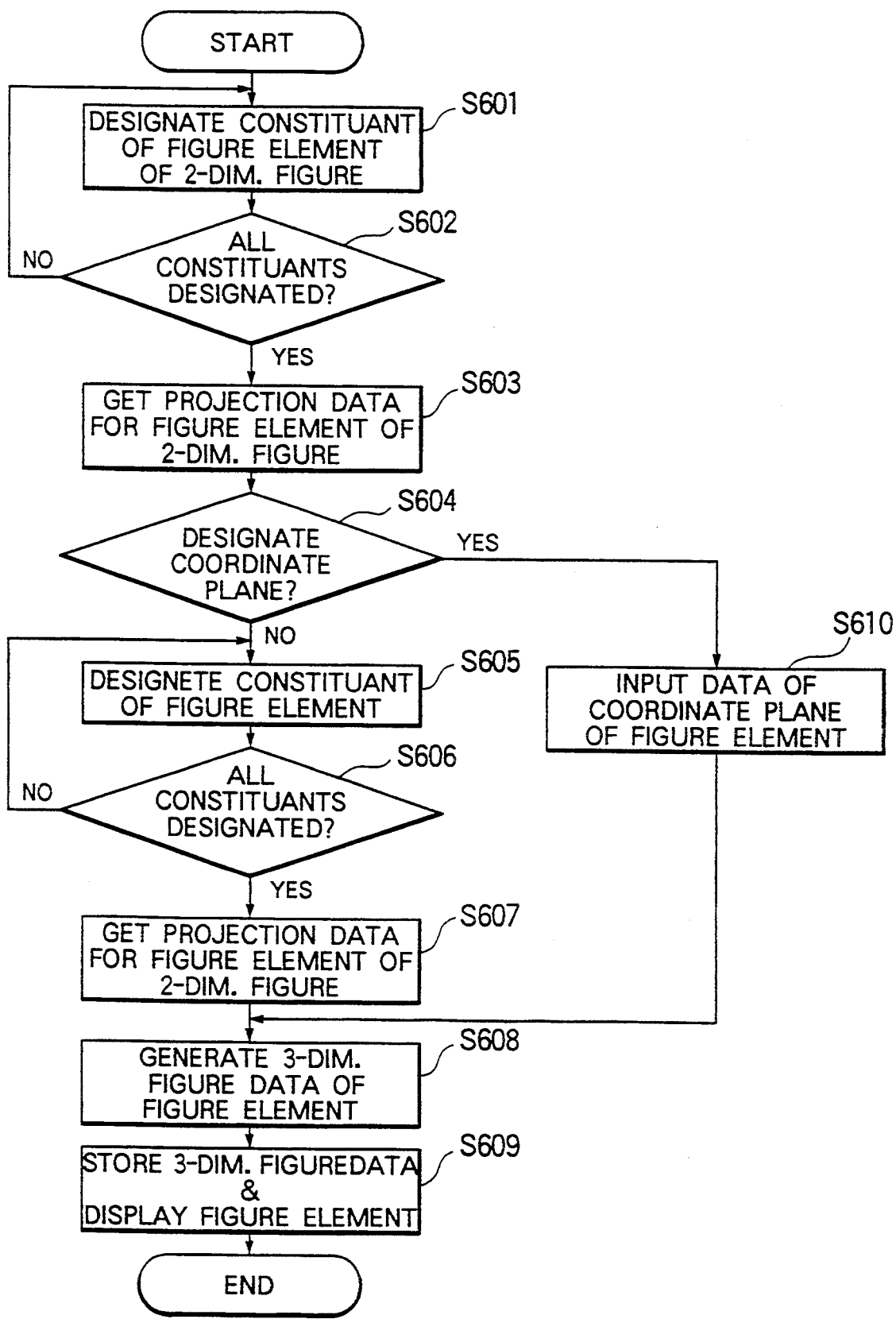
FIG. 6 is a flowchart showing the generation of three-dimensional figure data according to this invention.

At step S305, three-dimensional figure data of respective figure elements of the three-dimensional figure are generated in accordance with the flowchart of FIG. 6. The procedure is described by reference to FIG. 7, in which the top and the front views are shown within the dotted box regions (a) and (b). The three-dimensional figure data are generated for each figure element of the three-dimensional figure on the basis of the two-dimensional figures (the top and the front views) defined and displayed view the steps S301 and S304.

Figure 7:
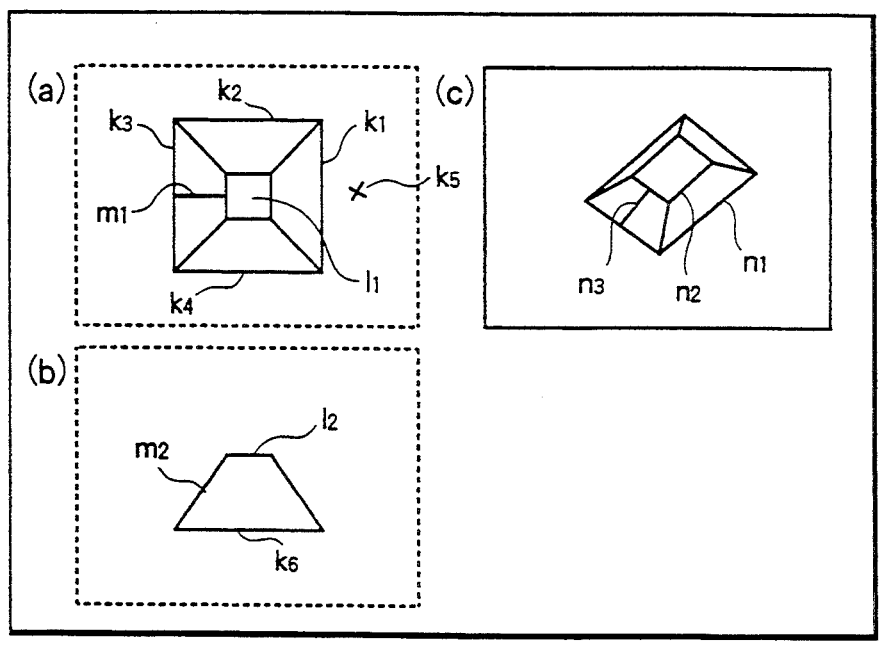
FIG. 7 shows the top and the front views together with a perspective view of a three-dimensional figure displayed in respective regions within the screen.

First, it is assumed that the bottom rectangle of the pyramidal frustum (shown by the lines k1, k2, k3, and k4 within box (a) and by the line k6 within box (b) in FIG. 7) is the first figure element of the three-dimensional figure for which the three-dimensional figure data are to be generated.

At step S601, the line k1 is specified (pointed) by the mouse 2, etc., within the screen.

At step S602, it is determined whether or not all the constituents of the figure element, namely, the lines k1, k2, 3, and k4, are specified. If the judgment is negative, the control returns to step S601 to specify the remaining lines. When all the lines k1, k2, k3, and k4 are specified, the execution proceeds to the next step S603. Thus, the figure element (the bottom rectangle of the pyramidal frustum) is specified by means of the line k1, k2, k3 and k4. Alternatively, the figure element may be specified by designating the line k1 and the surface k5 having the figure element as the contour, such that the figure element is specified as the contour figure of the surface k5 including the line k1.

At step S603, the projection data of the figure element is determined. Namely, the set of view data 205 containing a display data 201 corresponding to the display region (a) is searched within the two-dimensional view data memory 17. The relevant projection data 202 is thus found.

At the next step S604, the operator determines whether the coordinate value (the Z coordinate value in this case) of the plane carrying the figure element specified at steps S601 and S602 is to be input via the keyboard 1, or the corresponding figure element (the line k6 in the box (b) in FIG. 7 in this case) of another projection view is to be specified. When the coordinate value of the plane is to be input via the keyboard 1, the execution proceeds to step S610. When the corresponding figure element of another projection view is to be specified, the execution proceeds to the steps S605 through S607.

First, the steps S604 through S607 are described. At step S605, a constituent of the figure element of another view (along a projection direction distinct from the projection direction of the view in which the figure element is specified at preceding steps S601 and S602) is specified. Thus, in the case of the bottom rectangle of the pyramidal frustum of FIG. 7, the line k6 of the front view shown within the box (b) is specified.

At step S606, it is determined whether or not all the necessary constituent elements of the figure element of the view (the front view in this case) are specified. If the judgment is negative, the control returns to step S605 to complete the specification. When the judgment is affirmative, the execution proceeds to the next step S607. In this case, only the line k6 in the box (b) is to be specified and thus the execution proceeds to step S607.

At step S607, the projection data for the figure element of the view is determined. This determination is effected as in step S603. Namely, the set of view data 206 containing display data 203 corresponding to the display region (b) is searched within the two-dimensional view data memory 17. The relevant projection data 204 is thus found. Then the execution proceeds to step S608.

When the execution proceeds from step S604 to step S610, the coordinate value of the plane carrying the figure element of the top view is input via the keyboard 1, and the execution proceeds to step S608.

Via the above steps, the information necessary for the generation of the three-dimensional figure data of the figure element (the bottom rectangle of the pyramidal frustum in this case) is complete. Thus, at step S608, the three-dimensional figure data for the figure element are generated. The three-dimensional figure data specifies the three-dimensional position of the figure element within the space.

Figure 8:
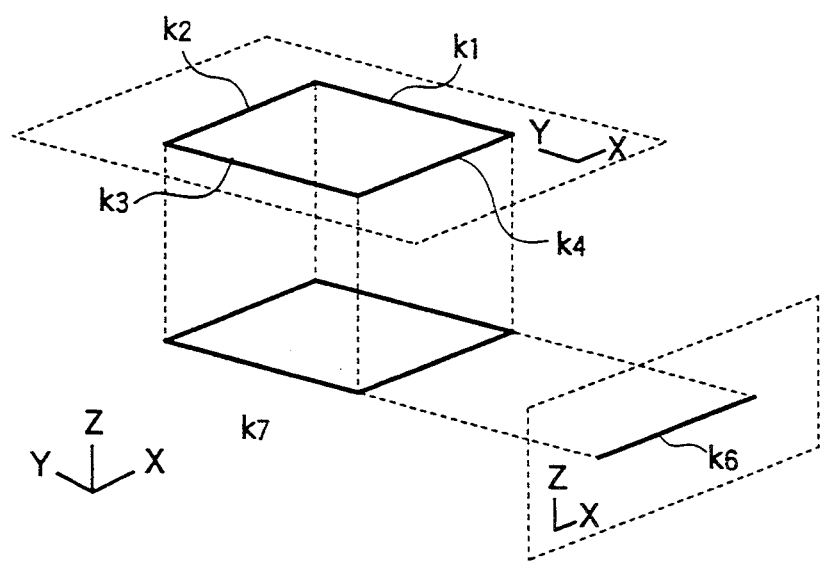
FIG. 8 is a perspective view showing the specification of the three-dimensional figure element by means of two two-dimensional figure elements, or by means of a single two-dimensional figure element and a Z coordinate value of the plane carrying the figure element.

FIG. 8 is a perspective view showing the specification of the three-dimensional figure element by means of two two-dimensional figure elements, or by means of a single two-dimensional figure element and a Z coordinate value of the plane carrying of the figure element. The X and Y coordinate values of the three-dimensional figure element k7 are determined via the lines k1, k2, k3, and k4 of the two-dimensional figure element of the top view. The Z coordinate of the three-dimensional figure element k7 is that of the line k6 of the front view. Thus, the three-dimensional figure element k7 is specified via the two two-dimensional figure elements. Alternatively, the three-dimensional figure element k7 is specified via the top view thereof and the Z coordinate input via the keyboard 1.

At step S609, the three-dimensional figure data of the figure element are stored in the three-dimensional figure data memory 8 and the three-dimensional figure represented by the three-dimensional figure data is displayed on the screen on the basis of the predetermined three-dimensional view data stored in the three-dimensional view data memory 6. In the above case, the three-dimensional figure element k7 is displayed as a parallelogram n1 within the perspective projection view region (c) shown in FIG. 7.

Thus, the procedure of FIG. 6 is terminated and a three-dimensional figure element (the bottom rectangle k7 of the pyramidal frustum in the above case) is completely defined.

The above procedure of FIG. 6 corresponds to step S305 in FIG. 3. At the next step S306, it is determined whether or not all the necessary figure elements of the three-dimensional figure are defined. If the judgment is negative, the control returns to step S305 to repeat the procedure of FIG. 6 for another figure element. If the judgment is affirmative, the definition of the three-dimensional figure is now complete and the procedure of FIG. 3 is thus terminated.

Thus, the top rectangle (the contour figure of the top surface) of the pyramidal frustum is defined by another figure element specification procedure shown in FIG. 6. Then, the rectangle enclosing the surface 11 within the top view region (a) as shown in FIG. 7 is specified and then the line 12 within the front view region (b) is specified. When the three-dimensional figure data for the to rectangle are generated, the perspective projection figure n2 thereof is displayed in the perspective projection view region (c).

At the next three-dimensional figure data generation procedure cycle of the figure element shown in FIG. 6, the curve m1 in the top view region (a) and the curve m2 in the front view region (b) are specified as a section curve on a side surface of the pyramidal frustum. Then the projection tablet n3 of the section curve in the perspective direction is displayed in the region (c) as shown in FIG. 7.

In the case of the pyramidal frustum, the ridges are superfluous for the specification of the whole three-dimensional figure. Thus, the definitions of the ridges are not necessary, and the input operation becomes more efficient.

Further, the curved surface 18e shown in FIG. 18 can also be defined. Namely, with respect to the figure elements n1, n2, ad n3 displayed on the screen, the figure elements n1 and n2 are specified as the contour lines and the figure element n3 is specified as the section curve to define the curved surface 18e. The thus defined curved surface 18e is stored in the three-dimensional figure data memory 8, and may be displayed on the screen with lattice as shown in FIG. 18.

As described above by reference to FIG. 3, the display data of the two-dimensional view data and the display data of the three-dimensional view data can be set independently of each other. Thus, the positions of the two-dimensional views (for example, the top and the front views) within the screen and the position of the perspective projection view within the screen can freely be arranged, and the enlargement and contraction of respective views can be effected freely by the operator. Thus, the screen can be made easy to observe and the data input operation becomes easy and efficient.

Further, when a three-dimensional figure having freely shaped curved surfaces for which a number of sectional views are necessary is to be defined, as many number as necessary of sets of the two-dimensional figure data and two-dimensional view data for representing the sectional views can be stored in the two-dimensional figure data memory 15 and the two-dimensional view data memory 17, respectively, such that the views are selectively displayed on the screen. Thus, the definition of such complex three-dimensional figure is facilitated.

Figure 20A:
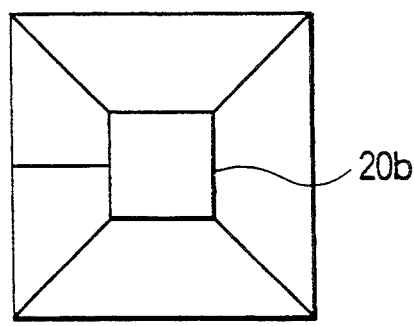
FIG. 20 is a view of a pyramidal frustum after an editing process.
Figure 20B:
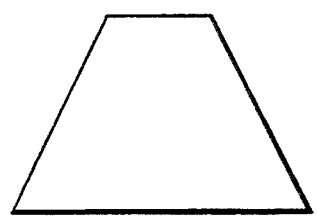

Next, the editing or modification of the three-dimensional figure as described above is described, it is assumed that the form of the pyramidal frustum is modified from that of FIG. 19 to that of FIG. 20. First, the top line 19b (corresponding to the top surface of the pyramidal frustum) and the two sides 19a and 19c (corresponding to the side surfaces) of the front view (B) shown in FIG. 19 are modified. Next, the contour figure element 12b (corresponding to the top surface of the pyramidal frustum) and the line 17f (representing a section curve) are redefined. These modifications or redefinitions are effected similarly as the original definitions thereof described above. The redefinitions of the ridges 12c, 12d, 12e, and 12f are usually unnecessary. Thus, the modification or editing of the three-dimensional figure data is also facilitated.

In accordance with the procedure shown in FIG. 3, the three-dimensional figure data of respective three-dimensional figure elements constituting a three-dimensional figure are stored in the three-dimensional figure data memory 8. The box (b) in FIG. 2 shows an example of three-dimensional figure data stored in the three-dimensional figure data memory 8. The three-dimensional figure data includes: the data on points 221; the data on lines 222; the data on circles 223; the data on curves 224; and data on curved surfaces 225. When the three-dimensional figure does not include, for example, circles or curved surfaces, the entries therefor are left unfilled or deleted. Each item includes data for as many numbers of points, lines, etc., as are necessary.

A curved surface may be defined as follows. For example, the curved side surface of a cylinder may be defined by the form of the horizontal section of the cylinder and the vertical sweeping movement range of the horizontal section. More specifically, the two-dimensional figure data of the sectional contour (e.g., a circle) of the cylinder and the projection data thereof are specified together with the two-dimensional figure data for the two-dimensional figure representing the range of the movement the sectional contour and the projection data thereof.

Figure 9:
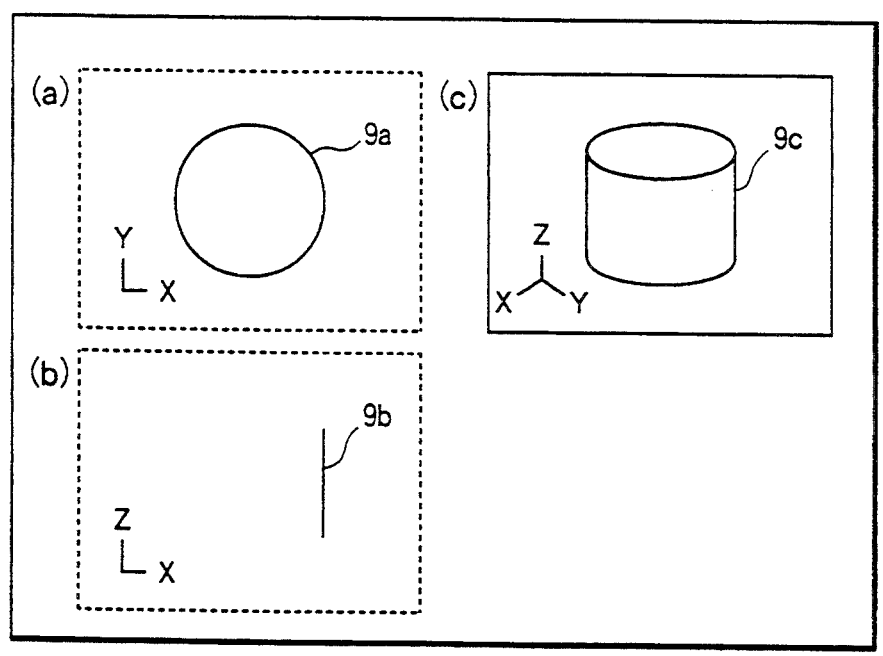
FIG. 9 shows the sectional contour figure (a) and the range of sweep movement (b) thereof generating a cylinder (c)

FIG. 9 shows the sectional contour figure (a) and the range of sweep movement (b) thereof generating a cylinder (c). The circle 9a shown in the dotted box region (a) within the screen is the two-dimensional sectional contour figure of a cylinder. The circle 9a lies on a plane parallel to the X-Y plane. The line 9b shown in the region (b) within the screen represents the range of sweeping movement of the circle 9a. Thus, the movement of the circle 9a is parallel to the Z axis. As a result, a cylinder is completely defined. The perspective projection view 9c of the cylinder in accordance with the projection data stored in the three-dimensional figure data memory 8 is then displayed in the region (c) within the screen.

Further, when a three-dimensional curve which does not lie on a plane parallel to one of three coordinate planes (the X-Y plane, Y-Z plane, and the X-Z plane) may be defined by specifying the two two-dimensional projection figures on, say, the X-Y and the X-Z planes. The projection figures are swept (i.e., moved) in the respective projection directions. That is, the projection figure on the X-Y plane is swept in the Z direction and the projection figure on the X-Z plane is swept in the Y direction. The intersection of the resulting two cylindrical surfaces defines the original three-dimensional curve.

The three-dimensional figures may include the three-dimensional working paths of a numerically controlled machine tool. As described above, on the basis of the three-dimensional figure data stored in the three-dimensional figure data memory 9 and the three-dimensional view data stored in the three-dimensional view data memory 6, the three-dimensional figure including the work paths can be displayed in a perspective projection view within a predetermined display region within the screen. Further, on the basis of the three-dimensional figure data and the two-dimensional view data stored in the two-dimensional figure data memory 15, the top and the front views, etc., of the three-dimensional figure including the work paths can be displayed in the respective display regions. The display of the work path, etc., facilitates the judgment with respect to the appropriateness of the positions of the work paths or the dimensions of the three-dimensional figure.

Furthermore, it is also possible to input the three-dimensional figure data directly via the three-dimensional figure definer/editor unit 18 as in the case of the conventional device. When the three-dimensional figure data are input directly via the three-dimensional figure definer/editor unit 18 and stored in the three-dimensional figure data memory 8, the top and the front views, etc., may be displayed in predetermined respective regions within the screen in accordance with the two-dimensional view data stored in the two-dimensional view data memory 17.

Still further, it is also possible to modify the three-dimensional figure data stored in the three-dimensional figure data memory 8 via the three-dimensional figure definer/editor unit 18. Then, the top and the front views, etc., of the modified three-dimensional figure can be displayed on the screen. Further, although the flowchart of FIG. 3 defines first the figure elements of two-dimensional figures and then those of the three-dimensional figure, the definitions of the three-dimensional and the two-dimensional figure elements may be effected alternately.

As described above, according to this invention it is possible to generate the top and the front view, etc., of a three-dimensional figure whose three-dimensional figure data is input via the three-dimensional figure definer/editor unit 18. This is effected by generating the two-dimensional figure data on the basis of the three-dimensional figure data in accordance with the two-dimensional view data stored in the two-dimensional view data memory 17. Conversely, when the two-dimensional view data and the two-dimensional figure data of the top and the front views, etc., of a three-dimensional figure are input via the two-dimensional view data setter unit 16 and the two-dimensional figure definer/editor unit 14, respectively, the three-dimensional figure data can be generated and the perspective projection view of the three-dimensional figure can be displayed in accordance with the three-dimensional view data stored in the three-dimensional view data memory 6. Since the two-dimensional figure data and the two-dimensional view data of the top and the front views, etc., are stored in the two-dimensional figure data memory 15 and the two-dimensional view data memory 17, respectively, with data numbers showing the correspondence between the sets of the two-dimensional figure data and the two-dimensional view data, the three-dimensional figure data can be generated easily and efficiently via the procedure of FIG. 3. The two-dimensional figure data numbers shown in the box (a) in FIG. 2 and the two-dimensional view data numbers shown in the box (c) in FIG. 2 are stored in the two-dimensional figure data memory 15 and the two-dimensional view data memory 17, respectively.

Alternatively, the display regions within the screen of the top and the front views, etc., may be fixed beforehand, the two-dimensional figure data of the respective views being stored in predetermined memory addresses within the two-dimensional figure data memory 15. Then, the two-dimensional view data of the respective display regions are fixed and known when a display region is specified. Thus, the three-dimensional figure data of the three-dimensional figure can be generated from the two-dimensional figure data in a manner similar to that described above.

As described above, the two-dimensional views (the top and the front views) are displayed within dotted-line frames, while the three-dimensional or perspective projection view constructed in accordance with the three-dimensional figure data and the three-dimensional view data is displayed within a solid line frame. The operator can thus easily distinguish between the two kinds of views. Alternatively, the two kinds of views may be distinguished by: the color of the frames of the regions, the breadth of the frames, the color of the displayed figures, the background color of the display regions, or the color or the form of the cursor for the mouse 2 or the tablet 3.

It is also noted that the three-dimensional figure data generator device according to this invention is applicable not only to CAD/CAM devices but also to automatic programming devices or automatic programming functions implemented within a numerically controlled machine tool.

What is claimed is:

1. A three-dimensional figure data generator device comprising:

two-dimensional view data setter unit means for setting two-dimensional view data including: perspective projection data representing first and second perspective projection directions of a three-dimensional figure; and display data specifying first and second display regions of first and second two-dimensional perspective projection views, respectively, of said three-dimensional figure along said first and second perspective projection directions;

two-dimensional view data memory means for storing said two-dimensional view data;

two-dimensional figure data definer means for entering two-dimensional figure data defining two-dimensional forms of two-dimensional figures in each of said first and second two-dimensional perspective projection views;

two-dimensional figure data memory means for storing said two-dimensional figure data;

three-dimensional figure data generator means for generating three-dimensional figure data of said three-dimensional figure representing a three-dimensional form of said three-dimensional figure in accordance with said two-dimensional figure data stored in said two-dimensional figure data memory means and said perspective projection data stored in said two-dimensional view data memory means; and display means for displaying said two-dimensional figures of said first and second two-dimensional perspective projection views in accordance with said two-dimensional figure data stored in said two-dimensional figure data memory means and said display data stored in said two-dimensional view data memory means and for displaying said three-dimensional figure of said three-dimensional figure data.

2. A three-dimensional figure data generator device as claimed in claim 1, wherein:

a first set of two-dimensional view data representing said first perspective projection direction and said first display region and a second set of two-dimensional view data representing said second perspective projection direction and said second display region are stored in said two-dimensional view data memory means with respective distinct two-dimensional view data numbers;

a first set of two-dimensional figure data defining the two-dimensional figure of said first perspective projection view and a second set of two-dimensional figure data defining the two-dimensional figure of said second perspective projection view are stored in said two-dimensional figure data memory means with respective distinct two-dimensional figure data numbers corresponding to said respective distinct two-dimensional view data numbers of said first and second sets of two-dimensional view data; and said three-dimensional figure data generator means establishes correspondence between said first and second sets of two-dimensional figure data and said first and second sets of two-dimensional view data on the basis of said two-dimensional view data numbers and said two-dimensional figure data numbers.

3. A method for generating three-dimensional figure data in a data processor device, comprising the steps of:

entering into said data processor device two-dimensional view data including perspective projection data representing a perspective projection direction of a two-dimensional plane and display data specifying a display region of said two-dimensional plane, for at least two different perspective projection directions, so as to obtain at least two different two-dimensional perspective projection views;

entering into said data processor device two-dimensional figure data defining two-dimensional forms of two-dimensional figures for each of said at least two different two-dimensional perspective projection views;

identifying elements of two-dimensional figure data in one of said at least two different two-dimensional perspective projection views which correspond to elements of two-dimensional figure data in the other of said at least two different two-dimensional perspective projection views;

generating three-dimensional figure data representing a three-dimensional form of a three-dimensional figure in accordance with said entered two-dimensional figure data for each of said at least two different two-dimensional perspective projection views and said identified corresponding elements; and displaying said generated three-dimensional figure data on a display of said data processor device.

* * * * *

UNITED STATES PATENT AND TRADEMARK OFFICE
CERTIFICATE OF CORRECTION

PATENT NO. : 5,428,715
DATED : June 27, 1995
INVENTOR(S) : Junko Suzuki

It is certified that error appears in the above-indentified patent and that said Letters Patent is hereby corrected as shown below:

Col. 1, line 24, "view" should be -- via --; Col. 5, line 66, "definer editor" should be -- definer/editor --; Col. 6, line 36, "display" should be -- view --; Col. 6, line 37, "view" should be -- display --; Col. 6, line 40, "display" should be -- view --; Col. 6, line 40, "view" should be -- display --; Col. 7, line 38, "view" should be -- via --; Col. 8, line 45, "3" should be -- k3 --; Col. 10, line 18, "to" should be -- top --; Col. 10, line 37, "ad" should be -- and --.

Signed and Sealed this

Twenty-sixth Day of September, 1995

Attest:

BRUCE LEHMAN

Attesting Officer *Commissioner of Patents and Trademarks*